Patented Dec. 1, 1925.

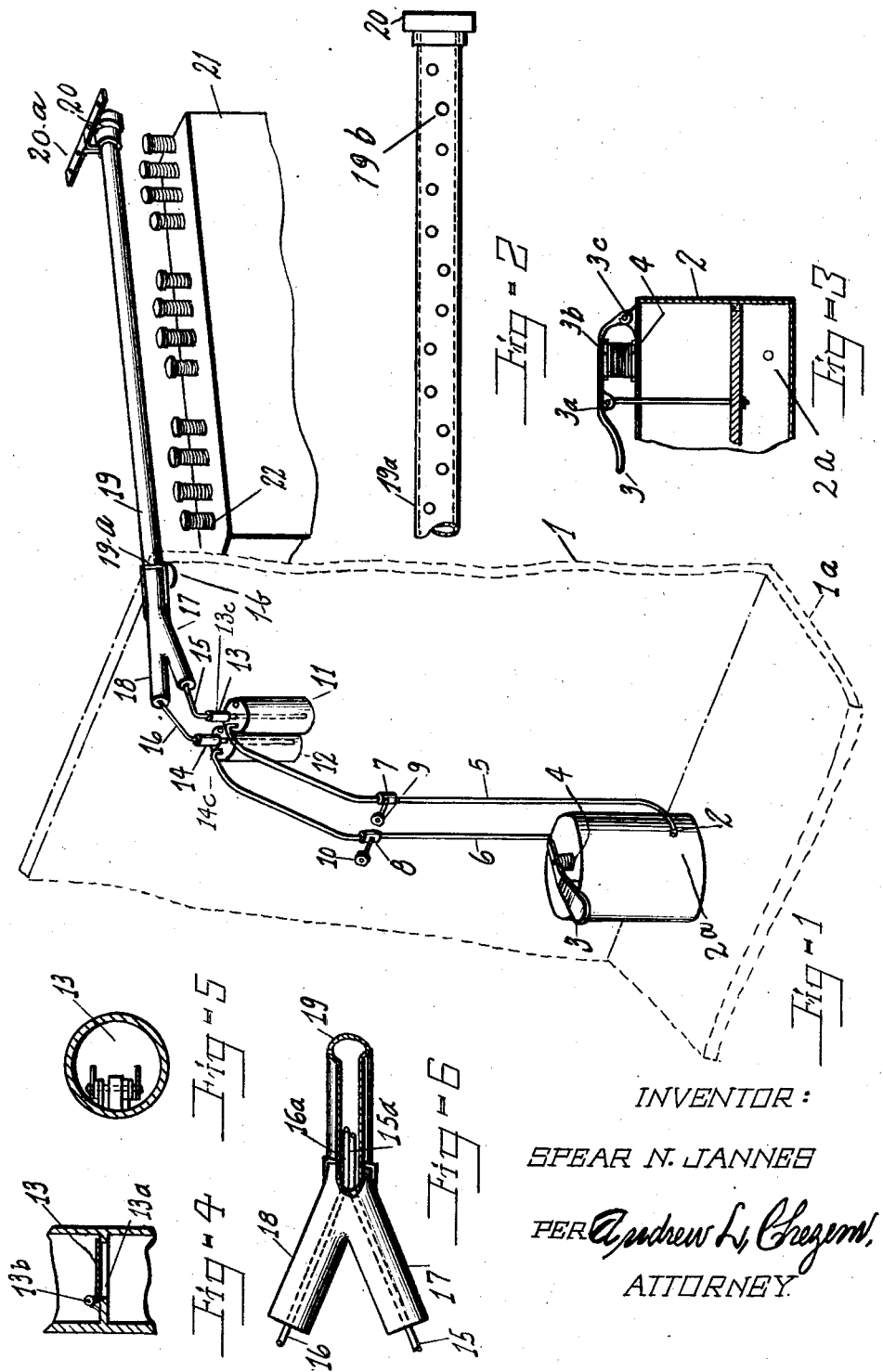

1,563,493

UNITED STATES PATENT OFFICE.

SPEAR N. JANNES, OF ROCK ISLAND, ILLINOIS.

VALVE LUBRICATOR.

Application filed August 18, 1923. Serial No. 658,108.

*To all whom it may concern:*

Be it known that I, SPEAR N. JANNES, a citizen of the United States, residing at Number 1813½ Second Avenue, city of Rock Island, in the county of Rock Island and State of Illinois, have invented a new and useful Valve Lubricator, of which the following is a specification.

My invention relates to improvements in valve lubricators which operate by air force and distribute lubrication to various points at the same time; and the objects of my invention are; first, to provide a means of furnishing to the valves of an engine or other machine alternately, cleansing liquids and lubricating oils, as desired, in desired quantities without being put to the pains of applying it by hand to each valve separately; second, to apply the cleansing liquid and oil alternately without the risk of soiling the hands or clothing; third, to enable the operator to apply the cleansing liquid and oil alternately as desired while the engine is in motion, from his cab or seat, with the vehicle or machine in motion; fourth, to provide a lubricating device capable of applying different lubricants in mixture from separate receptacles, together, or to apply different lubricants alternatively at will from different receptacles; fifth, to provide means of keeping the lubricating and cleansing liquids separate before and during the process of using.

I attain these objects by the mechanism illustrated in the accompanying drawing, in which, Figure 1, is a perspective view of the valve lubricator partly in side elevation, in position, upon broken portions of an automobile engine and dash; Fig. 2, is a plan view of a broken portion of the distributing pipe of the valve lubricator; Fig. 3, is a plan view in cross section of a broken portion of pump. Fig. 4, is a side elevation of a section of the distributing valve with the enclosing valve-base connection in part cut away; Fig. 5, is a top plan view of a distributing valve disclosing its attachment with the valve-base connection; Fig. 6, is a plan view of a section of the distributing pipe with a part cut away to disclose the attachment and working connection of the separate lead supply-pipes to the main distributing pipe.

Similar numerals refer to similar parts throughout the several views.

The air pump 2, the air distributing pipes 5 and 6, the liquid containers 11 and 12, the supply pipes 15 and 16, and the main distributing pipe 19, constitute the framework of my valve lubricator.

Vehicle dash 1, and floor 1ª serve as frames to secure the valve lubricator upon, by any suitable means. An air pump 2 is installed suitably out of the way on floor 1ª, said pump being provided with a pedal 3 for operation, which pedal is hinged at 3ᶜ and is lifted by spring 3ᵇ and connected to pump piston rod 3ª by any suitable means.

Out of opposite sides of pump 2 proceed air pipes 5 and 6, leading to lubrication containers 11 and 12, the pipe 5 connecting with container 11, and pipe 6 connecting with container 12. In each pipe 5 and 6 positioned suitably between pump 2 and containers 11 and 12 is installed a suitable cut off valve 7 and 8 respectively, which is operated by suitable knobs 9 and 10. Pipes 5 and 6 are intended to extend and be attached only into the tops of containers 11 and 12.

Each of said containers 11 and 12, have inwardly end installed lubrication pipes 15 and 16 leading from their bottoms out through their tops, pipe 15 leading from container 11 into branch 17 of distributing pipe 19, and pipe 16 leading from container 12 to branch 18 of distributing pipe 19. Container 11 is provided with hole and cap 23, and container 12 is provided with hole and cap 24, to facilitate filling with oil.

In the pipe 15, between container 11 and branch reduced distributing fork 17, a valve connection 13ᶜ containing a hinged air valve 13, of the form disclosed in Figs. 4 and 5 is installed which valve is closed by a spring 13ᵇ, and in pipe 16, between container 12 and branch reduced distributing fork 18, a valve connection 14ᶜ containing, a hinged air valve of the same form of valve 13 is installed, each of said valves being for the purpose of preventing the flow-back or mixture of oils or lubricants by regurgitation.

Distributing pipe 19 is constructed by having one of its ends closed with cap 20, and having its other end 19ª provided with hollow reducing connected forks 17 and 18, which reducing forks are suitable to receive the ends of small lubrication pipes 15 and 16 which are securely installed in said end 19ª in such way that the pipes 15 and 16 extend within and paralleling each other suitable distance therein to prevent the obstruction of the flow of the liquid therein by the sides of the distributing pipe 19.

Distributing pipe 19 is provided upon one of its sides, suitably spaced and disposed between cap 20 and end 19ª with a series of perforations 19ᵇ positioned therein suitable to conform to the valves 22 of an engine, for the purpose of dropping a liquid on said valves through said perforations, for cleansing or lubrication purposes as desired; so that it will be observed that as air is forced through said containers 11 and 12, through lubricating pipes 15 and 16 into distributing pipes 19, it will carry liquid out of said containers and distribute it through perforations 19ᵇ to valves 22.

I provide ordinary hanger means 20ª at one end and hole means 1ᵇ in the dash together with other suitable fastening means for suitably securing the distributing pipe 19 and connections in position for use.

I claim:—

1. In a motor vehicle having an internal combustion engine therein provided with outwardly projecting valves, and a dashboard associated with said engine; a lubricator comprising an air pump, a plurality of containers on said dash board, a conduit having a valve therein connecting each container with said pump, an apertured distributor projecting through said dash board and extending in proximity to said engine valves, and branched means connecting said distributor and said containers, said system permitting the discharge through said distributor apertures against said engine valves of fluid from said containers selectively.

2. A structure as defined in claim 1, in which said branched means comprises a forked extension of said distributor, and a plurality of pipes with check valves therein, each pipe leading from one of said containers through a branch of said extension and having a portion extending a substantial distance in the body of said distributor longitudinally thereof.

SPEAR N. JANNES.